US006427618B1

(12) United States Patent
Hilleman

(10) Patent No.: US 6,427,618 B1
(45) Date of Patent: Aug. 6, 2002

(54) BOW MOUNTED SYSTEM AND METHOD FOR JET-PROPELLING A SUBMARINE OR TORPEDO THROUGH WATER

(76) Inventor: Terry B. Hilleman, 1911 Knollwood Dr., Marshalltown, IA (US) 50158

( * ) Notice: Subject to any disclaimer, the term of this patent is extended or adjusted under 35 U.S.C. 154(b) by 0 days.

(21) Appl. No.: 09/718,753

(22) Filed: Nov. 22, 2000

Related U.S. Application Data

(60) Provisional application No. 60/167,464, filed on Nov. 24, 1999.

(51) Int. Cl.[7] .................................................. B63G 8/08
(52) U.S. Cl. ......................... 114/338; 114/20.2; 440/47
(58) Field of Search .............................. 114/20.2, 337, 114/338, 68 R; 440/47, 68

(56) References Cited

U.S. PATENT DOCUMENTS

| | | | |
|---|---|---|---|
| 3,779,199 A | * 12/1973 | Mayer | 440/68 |
| 4,346,662 A | * 8/1982 | Rogers | 114/67 R |
| 4,680,017 A | 7/1987 | Eller | |
| 4,831,297 A | 5/1989 | Taylor et al. | |
| 4,902,254 A | 2/1990 | Chas | |
| 5,252,875 A | 10/1993 | Veronesi et al. | |
| 5,383,801 A | 1/1995 | Chas | |
| 5,438,947 A | * 8/1995 | Tam | 114/337 |
| 5,634,419 A | 6/1997 | Cymara | |

OTHER PUBLICATIONS

"Jet Engine"; Encyclopedia Americana, International Edition, vol. 16, pp. 47–51, published by Grolier, Inc., Danbury, Conneticut, 1987.
"Fluids in Motion"; Introduction to College Physics, by Roger D. Rusk, pp. 173–181, publishd by Appleton–Century–Crofts, Inc., New York, New York, 1954.

* cited by examiner

Primary Examiner—Jesus D. Sotelo
(74) Attorney, Agent, or Firm—McKee, Voorhees & Sease, P.L.C.

(57) ABSTRACT

A jet propulsion system for an underwater vehicle, such as a submarine or torpedo is disclosed. The propulsion system includes a plurality of blades secured to a hub, in the front, which is rotated by a shaft connected to an engine through a transmission. A shroud surrounds the plurality of blades, and in combination with the body of the underwater vehicle, forms a nozzle through which flow is accelerated. The shroud is secured to the body of the underwater vehicle through a plurality of vanes. An additional hub including an additional set of blades may be secured to the underwater vehicle for additional thrust. The second hub may be located within the shroud. The inlet to the shroud may be covered with a screen mesh.

12 Claims, 5 Drawing Sheets

BOW MOUNTED SYSTEM AND METHOD FOR JET-PROPELLING A SUBMARINE OR TORPEDO THROUGH WATER

CROSS-REFERENCE TO RELATED APPLICATION

This application claims the benefit of U.S. provisional application Ser. No. 60/167,464 filed Nov. 24, 1999.

BACKGROUND OF THE INVENTION

1. Field Of The Invention

The present invention relates generally to aquatic propulsion systems and more specifically to a propulsion system, located in the front of the submarine, for a nuclear powered submarine. It may also be used for torpedo propulsion.

2. Problems In The Art

Currently, underwater vehicles, such as nuclear powered submarines, are propelled through the water using a propeller based propulsion system located at the stern of the vehicle. Drag forces acting on the vehicle cause the water around the vehicle to become displaced and turbulent in nature. Propeller based propulsion systems located at the stern are forced to push the submarine against this resultant turbulent water. This leads to decreased efficiency and a lower overall thrust. Further, current propeller based propulsion systems increase a submatine's noise which may aid others in detecting the submarine.

FIG. 1 depicts pictorially the general arrangement of a conventional Sea Wolf class submarine 10. A propeller 18 is located at the stern 16 of the submarine 10. Propeller 18 is driven by an axle 20 that is connected to a steam turbine 22 that can be powered by a nuclear reactor. A transmission 24 converts rotational power of axle 20 into a desired rotational speed for the propeller 10. Alternatively, an electric motor may be used for low noise emission.

A conventional configuration requires a propulsion system to essentially push the submarine through the water, causing drag and displacing or, the water in front of the submarine. This limits efficiency, stability, and speed.

Surface water vehicles also typically rely on a propeller fan either by an inboard or outboard stern positioned engine for propulsion. Similarly, this stern drive requires the vehicle to be pushed through the water, causing drag and displacing all the water in front of the vehicle, which limits efficiency, stability, and speed.

Attempts have been made to address these problems for surface water vehicles. U.S. Pat. No. 5,634,419 to Cymara discloses what is called a "front-drive boat" wherein a propeller propulsion system is located towards the stern (bow) of the boat which is claimed to increase stability of the boat.

U.S. Pat. No. 4,680,017 to Eller, entitled "motorboat propeller guard for improved performance", places a propeller inside a housing, with grids configured to attempt to direct propelled water rearwardly for improved performance.

Herein incorporated by reference, U.S. Pat. Nos. 5,383, 801 to Chas, 4,902,254 to Chas, 4,831,297 to Taylor et al., disclose propulsion systems for over the watercraft that adopt jet engine principles to attempt to increase propulsion.

Another propeller based propulsion systems is U.S. Pat. No. 5,252,875 to Veronesi, et al. herein incorporated by reference. Many of the above patents resemble a jet engine in appearance and further resemble a jet engine in the manner in which they are attached to a vehicle; i.e. they hang down from the craft.

Therefore, although attempts have been made to apply jet engine type principles to above water craft, and attempts have been made to increase stability of propulsion of over the water crafts, submarine propulsion systems have remained relatively the same, utilizing stern drive propeller fan propulsion.

There is therefore a need for a submarine propulsion system, which avoids these and other problems in the art.

FEATURES OF THE INVENTION

A general feature of the present invention is the provision of propulsion system for a submarine, which overcomes the problems found in the prior art.

Further feature of the present invention is a propulsion system for a submarine, which is more stable.

Further feature of the present invention is the provision of a propulsion system for a submarine, which is more efficient.

For further feature of the present invention is the provision of a propulsion system for a submarine which is fast.

A further feature of the present invention is the provision of a propulsion system for a submarine, which produces high thrust.

Another feature of the present invention is the provision of a propulsion system for a submarine, which may be maintained while underwater.

A still further feature of the present invention is the provision of a propulsion system for a submarine, which is located at, or towards the bow of the submarine.

Another feature of the present invention is the provision of a propulsion system for a submarine, which uses one or more propellers.

A still further feature of the present invention is the provision of a propulsion system for a submarine, which uses one or more nozzles.

These, as well as other features and advantages of the present invention, will become apparent from the following specification and claims.

SUMMARY OF THE INVENTION

The present invention generally comprises a propulsion system for an underwater vehicle, such as a submarine. The propulsion system generally comprises a propeller mounted on a hub which forces water from an inlet out an outlet through a nozzle thereby increasing the water's velocity and producing a propelling force.

In a preferred embodiment, the present invention includes a nuclear submarine wherein the propulsion system is located at the bow of the submarine. The propulsion system is a propeller-based system. A propeller is housed in a shroud, which is dynamically shaped to provide an airfoil effect and provide an inlet and outlet for water. Water passing through the inlet is accelerated by the propeller and forced into a nozzle region defined by the shroud and the remaining body of the submarine. The inlet to the shroud is covered by a guard, which aids in keeping sea debris from entering the shroud.

DETAILED DESCRIPTION OF THE PREFERRED EMBODIMENT(S)

The present invention will be described as it applies to its preferred embodiment. It is not intended that the present invention be limited to the described embodiment. It is intended that the invention cover all modifications and alternatives, which may be included within the spirit and scope of the invention.

Figure 1:
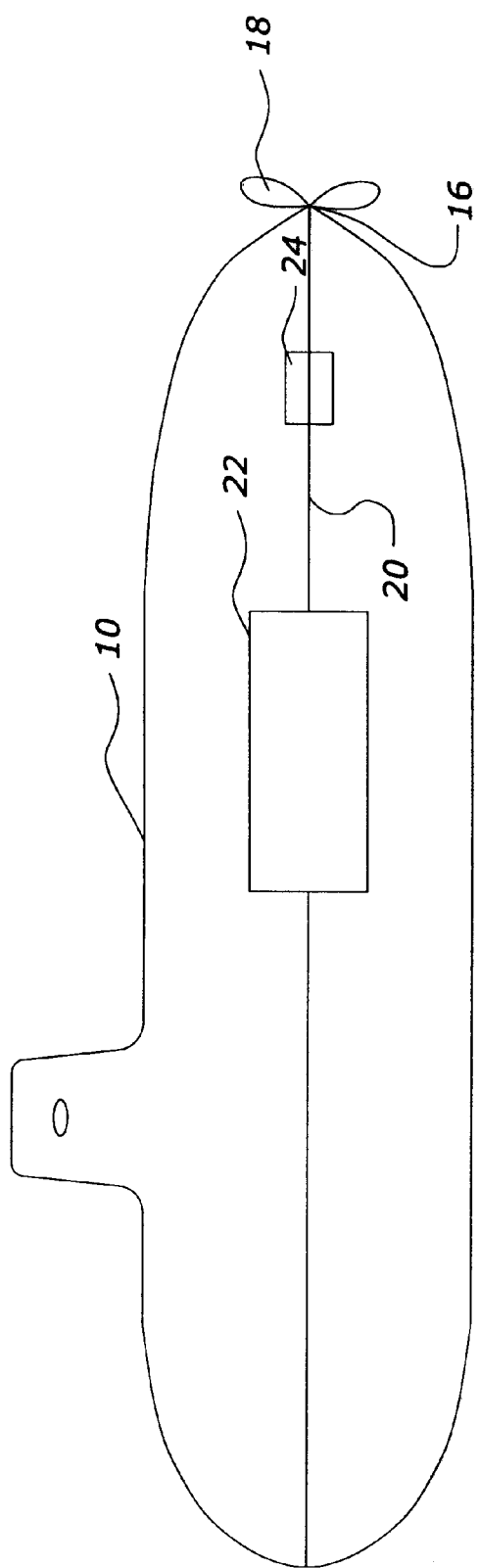
FIG. 1 is a pictorial view of a conventional rear propeller driven submarine.
Figure 2:
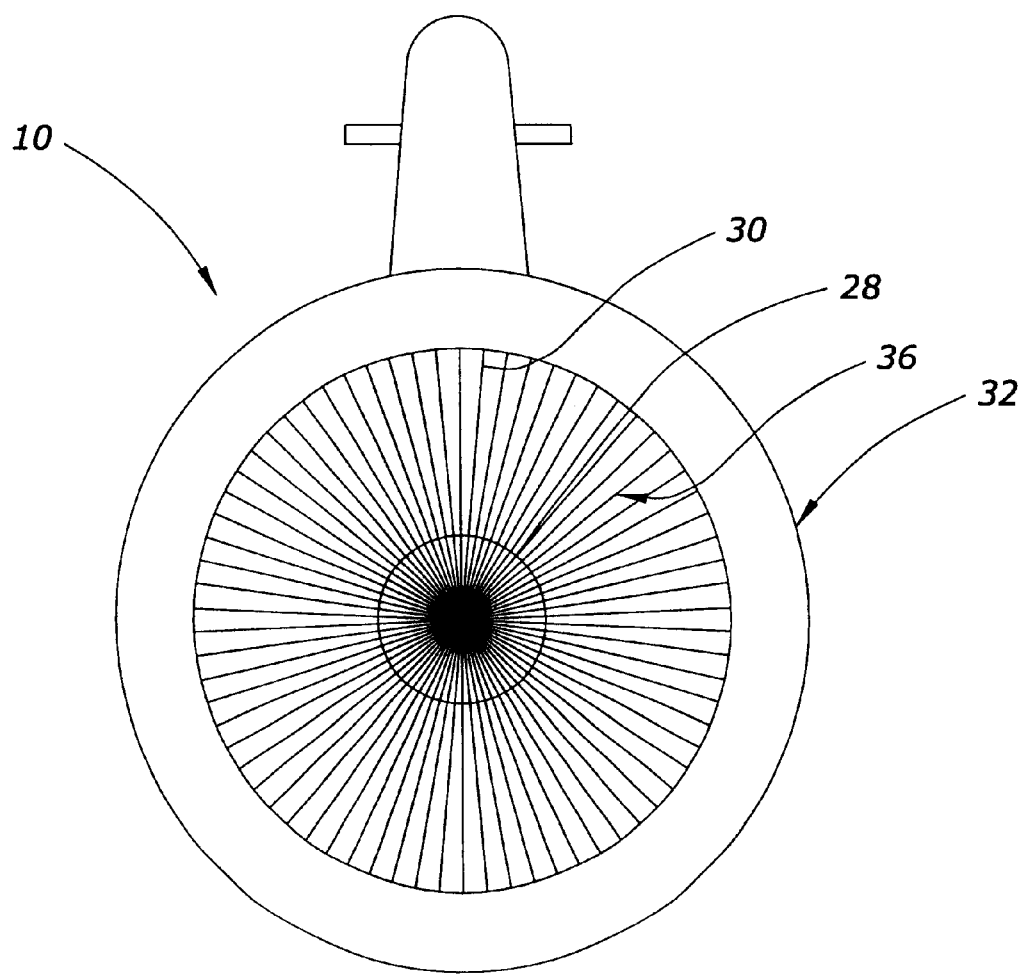
FIG. 2 is a front elevation view of a submarine according to an embodiment of the present invention.
Figure 3:
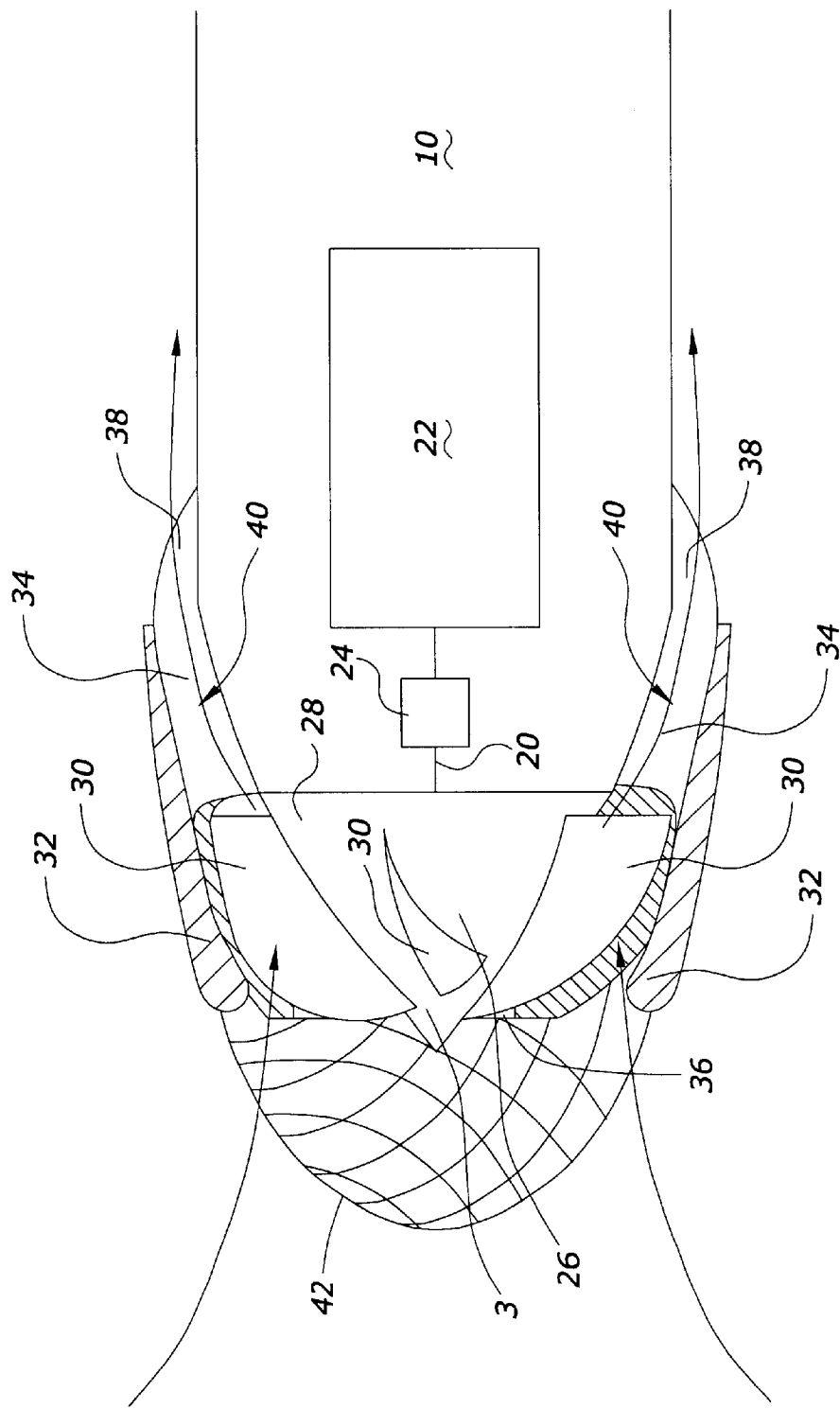
FIG. 3 is a cross-sectional side elevational view of showing one embodiment of a propulsion system.

Referring to the drawings, FIGS. 2 and 3 illustrate a submarine 10 with a propulsion unit 26 located at the very bow 14 of submarine 10. However, the inlet 36 for the propulsion unit 26 may be located anywhere on the submarine 10 which is prior to the separation point at which water flowing around the submarine 10 transitions from primarily laminar to primarily turbulent flow. The propulsion unit 26 may also be located or attached to wings on the side of the submarine.

The propulsion unit 26 comprises a shroud 32, which is secured to the submarine 10 via a plurality of vanes 34. These vanes 34 are dynamically shaped to introduce a minimal amount of disturbance into the flow. The vanes 34 could include several flaps or rudders to manipulate the flow of water through the shroud 32 to provide maneuvering functions for the submarine 10.

Prior to the vanes 34, the shroud inlet 36 is covered by a mesh or screen 42 which aids in keeping the propulsion unit 26 free of sea water debris. Water flows through screen 42 and into the shroud 32. As is illustrated in FIG. 2, almost the entire front of the submarine 10 is an inlet 36 for water. The shroud 32 is dynamically shaped to accommodate the flow of water. A propulsion unit 26 resides within shroud 32. Propulsion unit 26 includes blades 30 secured to a hub 28 which is powered by the engine 22 located within the submarine 10. The engine 22 can be a steam turbine powered by a nuclear reactor. A fluid pathway exists between a front inlet 36 and back outlet 38 through shroud 32.

In operation of the propulsion unit 26, the blades 30 are spun on the hub 28 at a rate so as not to cause unwanted cavitation and thereby decreased efficiency and increased noise. The propulsion unit 26 may be secured within shroud 32 so as to reduce the turbulence generated by propulsion unit 26. Water is given added momentum by propulsion unit 26 and then flows past propulsion unit 26.

Hub 28 is operatively secured to the main body 12 of the submarine 10. Within submarine 10, hub 28 is powered by a steam turbine in turn powered by an engine or power source 22, which is typically of the nuclear variety. Electric, diesel, and other sources of power may be used. Upon the application of power from the engine 22 to hub 28 through a drive shaft 20, which may include a transmission 24, hub 28 spins. This spin turns the blades 30, which in turn adds momentum to the water in the inlet.

The water from the inlet flows past the propulsion unit 26 into the nozzle region 40. The nozzle region 40 is dynamically designed to provide maximum stability. This nozzle region 40 resembles the nozzle region for the secondary stream of airflow found in current jet turbofan engines with high bypass ratios. The nozzle region 40 is defined by the inner surface of the shroud 32 and an exterior surface of the submarine 10. Essentially, the nozzle region 40 defines an ordinary plug type nozzle commonly known in the art.

Thus, as shown in FIG. 3, at the very front or bow 14 of submarine 10, a fan rotor or propulsion unit 26 essentially takes up the entire front (again see FIG. 2). Rotation of the propulsion unit 26 draws water from the entire front of submarine 10 into shroud 32 and forces it into nozzle 40. Water that had to be displaced from the bow of a conventional submarine, causing drag, is now used to power the front-drive submarine 10, thereby increasing efficiency and speed. From the outer surface of shroud 32, you see locations identified by "air foil" in FIG. 3, also can be shaped to streamline the submarine 10.

Jet power principles are utilized to pull in water, force it through the nozzle regions 40, and utilize the exterior body of submarine 10 itself, as part of the nozzle. Water is ejected at an increased velocity directly back along the exterior surface of submarine 10. This is believed to accomplish all of the stated objectives of the invention including providing a more stable propulsion system, a more stable propulsion system like front-wheel drive of a vehicle, a more efficient propulsion system because of the greatly diminished drag, and a faster propulsion system because submarine 10 is pulled, not pushed, through the water by both propeller induced water displacement and nozzle induced thrust.

The particulars of the design of propulsion system can be varied according to desire. Chas U.S. Pat. Nos. 5,383,801, and 4,902,254, incorporated herein by reference, illustrate and describe structures for over the water vehicle jet thrusters that could be applied in a present situation but enlarged as indicated to cover the entire bow 14 of submarine 10. Vanes 34 must be designed to provide sufficient structural support and rigidity for shroud 32. Additionally, the entire propulsion unit 26 must be water tight with respect to the interior of submarine 10.

In the preferred embodiment, submarine 10 is on the order of a Sea Wolf class submarine 10, or at least a submarine 10 big enough to utilize a nuclear reactor. However, it could be used on other under water vehicles of any size and configured accordingly, including, but not limited to personal submarines, torpedoes, and other nonpersonal carrying craft. Furthermore, optionally a rear or stern propeller 18 could be retained as a backup for propulsion system or for stealth operation, usually with an electrical engine.

It is to be further understood that the propulsion unit 26 is dynamically designed according to desired performance characteristics. Configuration is similar to that used in present jet engines and is sometimes referred as a bypass flow nozzle. It is essentially a plug that is placed in a cone-shaped object thereby restricting flow. While the propulsion unit 26 that is described above may not totally eliminate drag, it will reduce drag to essentially the frictional drag associated with the shape of the submarine body 12 past the shroud 32, assuming the submarine body 12 is appropriately shaped.

Figure 4:
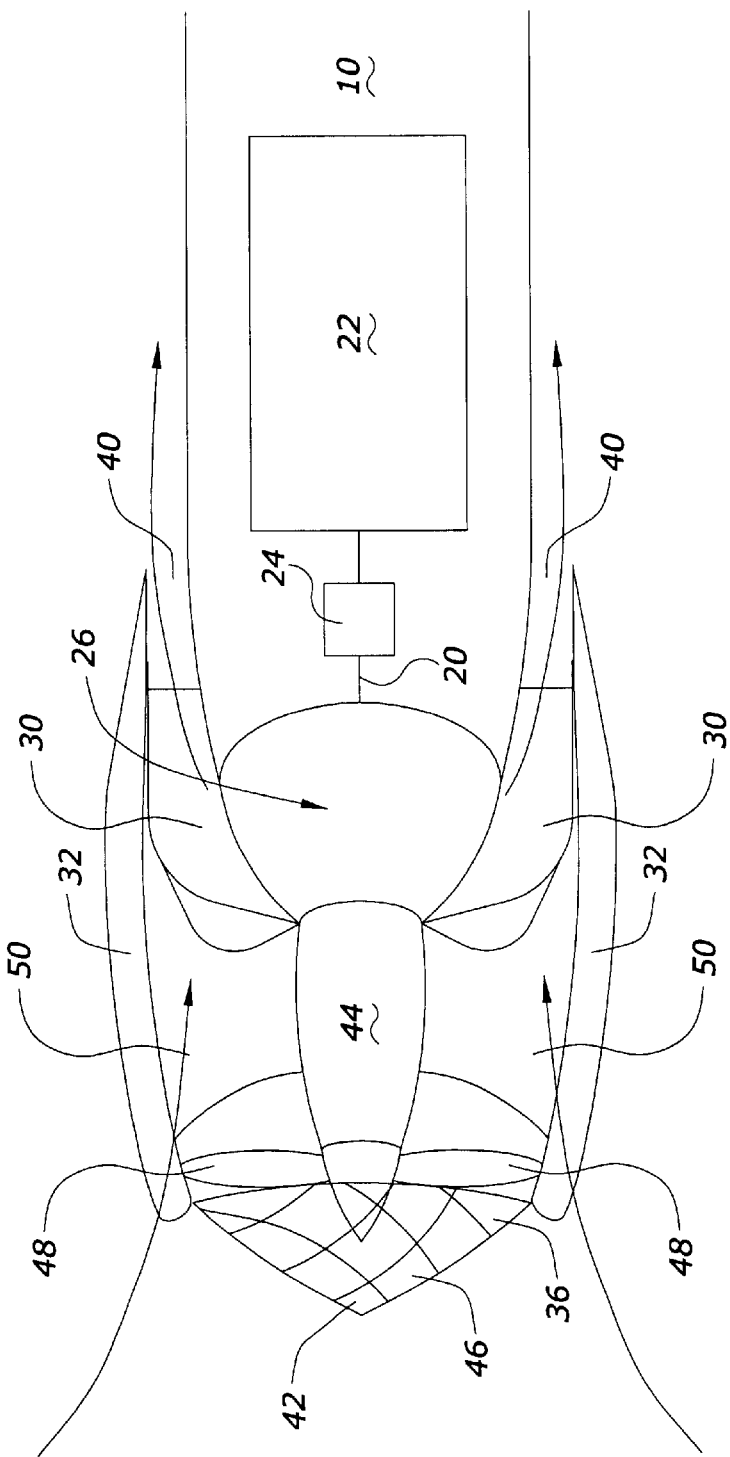
FIG. 4 is similar to FIG. 3, but shows an alternative embodiment of the propulsion system.
Figure 5:
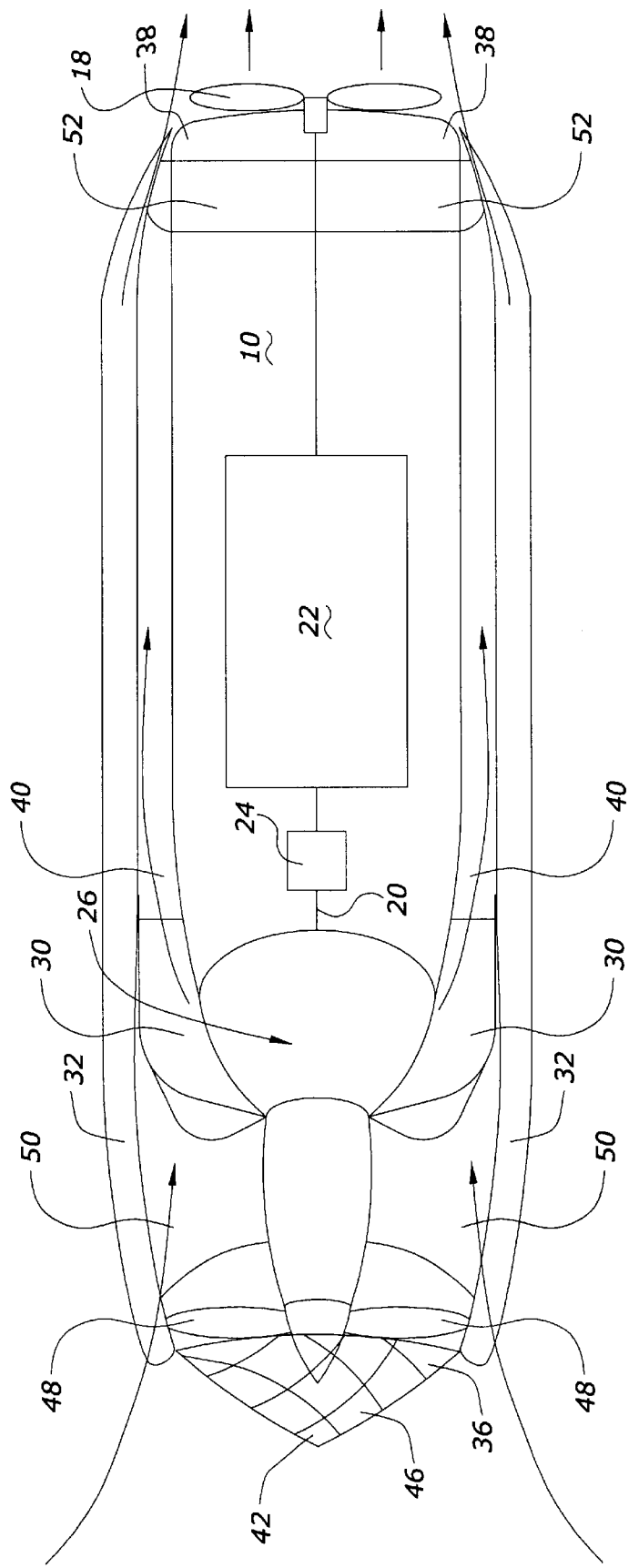
FIG. 5 is another alternative embodiment of the invention.

An alternative propulsion system is shown in FIGS. 4 and 5. It utilizes essentially the same configuration of FIG. 3, including a hub 28, with blades 30, in a shroud 32. However, additionally, an extension 44 extends out to a hub 46 upon which a plurality of blades or a fan 48 rotates. By appropriate transmission, not shown, the front most fan 48 can turn at a different speed than blades 30 on hub 28. Struts 50 are spaced apart radially from extension 44 to hold shroud 32. In the preferred embodiment, it is contemplated there could be four struts 50 but this number could vary according to desire.

Similar to certain jet airplane engines, the configuration of FIG. 4 could operate as follows. Water would be moved at a high velocity by fan 48 at a rate greater than the flow of water into the inlet 36 of the submarine 10. Water at a higher velocity from the fan 48 is then passed by blades 30. Water at a greater velocity from the blades 30 is then passed into the nozzle region 40. Water at the higher velocity is thus exhausted out of nozzle region 40 as an exhaust jet to provide very high velocity water jet propulsion in a straight line. Again this would provide even more efficient and more stable operation of submarine 10 and is believed to provide faster speeds through the water.

Another variation, shown in FIG. 5, is to exhaust the jet stream at the rear of the submarine 10, conducting it through an area between an inner and outer hull. Additional turbine blades 52 at the rear (stern) 16 of the submarine 10 between the two hulls would provide a multi-stage blade jet assist system and possibly eliminate the need for a rear propeller 18.

A general description of the present invention as well as a preferred embodiment of the present invention has been set forth above. Those skilled in the art to which the present invention pertains will recognize and be able to practice additional variations in the methods and systems described which fall within the teachings of this invention.

Accordingly, all such modifications an additions are deemed to be within the scope of the invention which is to be limited only by the claims appended hereto.

What is claimed is:

1. A propulsion system for a submarine including a body, bow and stem ends, and a power source, the propulsion system comprising:
   a first hub adapted for operative connection to a body and a power source, said first hub adaptable to be located away from the stem end of the submarine;
   a second hub;
   a first set of blades secured to the first hub which are capable of providing propulsion upon the rotation of the first hub; and
   a second set of blades secured to the second hub.

2. The propulsion system of claim 1 further comprising:
   a shroud around the blades; and
   a plurality of vanes secured to the shroud and the submarine.

3. The propulsion system of claim 2 further comprising:
   an inlet to the shroud; and
   a screen covering said inlet.

4. The propulsion system of claim 2 wherein the shroud and a portion of the submarine form a nozzle.

5. The propulsion system of claim 4 wherein the second hub is located at the stern of the submarine.

6. The propulsion system of claim 1 wherein the power source is a nuclear power source.

7. The propulsion system of claim 1 wherein the first hub is located at the bow end of the submarine.

8. The propulsion system of claim 1 in combination with a submarine.

9. A torpedo having a bow-mounted propulsion system, the torpedo comprising:
   a body having a bow and a stem;
   a power source contained within the body;
   a driveshaft for rotating a first hub about an axis, the driveshaft operatively connecting the power source to the first hub located away from the stem;
   a plurality of blades secured to the first hub capable of providing propulsion upon the rotation of the first hub;
   a shroud having an inner diameter equal to or greater than the diameter of the plurality of blades as secured to the first hub, said shroud and a portion of the body of the torpedo forming a nozzle;
   a plurality of vanes securing the shroud to the body of the underwater vehicle; and
   a second hub operatively connected to the power source; and
   a second set of blades connected to the second hub.

10. The torpedo of claim 9 further comprising a transmission operatively connected to the driveshaft and the power source.

11. The torpedo of claim 9 wherein the second hub is located within the shroud.

12. The torpedo of claim 9 wherein the second hub is located at the bow of the underwater vehicle.

* * * * *